United States Patent Office 3,365,658
Patented Jan. 23, 1968

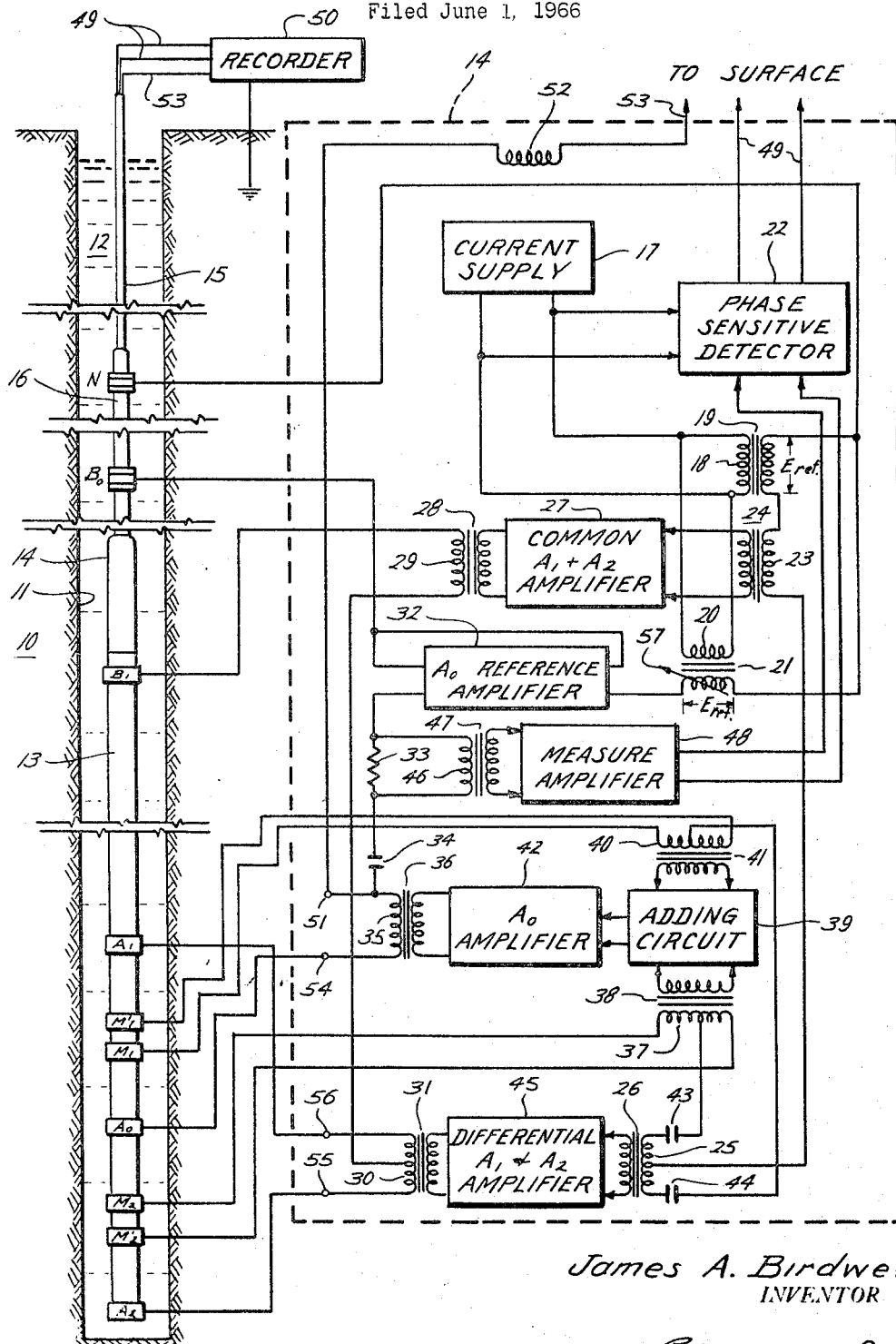

3,365,658
FOCUSED ELECTRODE LOGGING SYSTEM FOR INVESTIGATING EARTH FORMATIONS, INCLUDING MEANS FOR MONITORING THE POTENTIAL BETWEEN THE SURVEY AND FOCUSING ELECTRODES
James A. Birdwell, Houston, Tex., assignor to Schlumberger Technology Corporation, Houston, Tex., a corporation of Texas
Filed June 1, 1966, Ser. No. 554,516
13 Claims. (Cl. 324—10)

This invention relates to apparatus for investigating subsurface earth formations traversed by a borehole and, particularly, to such apparatus which measure the electrical properties of the subsurface earth formations adjacent the borehole.

More particularly, the invention relates to an electrode system for measuring the electrical resistivity or conductivity of the subsurface earth formations by use of a so-called "focused" electrode system. In a "focused" electrode system, survey current is emitted from a central survey electrode into the adjacent earth formations. This survey current is focused into a relatively narrow beam of current outwardly from the borehole by a focusing current emitted from nearby focusing electrodes located adjacent the survey electrode on either side thereof.

An electrode system can maintain the voltage of the survey electrode constant and measure the variations in current, or maintain the current constant and measure the variations in voltage, or some combination of the two. In all three cases, in a focused system, it is customary to mainttain points on either side of the survey electrode at substantially the same potential as the survey electrode. In some focused systems, a pair of monitor electrodes are provided between the survey electrode and the focusing electrode on one side thereof and another pair of monitor electrodes are provided between the survey electrode and the focusing electrode on the opposite side thereof. Sufficient current is then supplied to one of the current-emitting electrodes so as to maintain the potential gradient across the monitor electrodes of each monitor pair at a substantially zero value. By so doing, it can be reasonably expected that the current emanating from the survey electrode will travel in a direction perpendicular to the axis of the tool for some radial distance outward from the borehole. The positions of the various electrodes utilized can be varied to provide the desired focusing action under given borehole conditions.

The accuracy of the focused electrode system depends to a great extent on the potential of the survey electrode being substantially the same as the potential at points on either side of the survey electrode. To produce this condition, feedback circuits which monitor the condition itself and supply sufficient current to one or more of the current-emitting electrodes to correct for errors, are provided.

In many cases, the borehole conditions and the spacing of the electrodes requires that the gain of the feedback amplifiers be substantially high for good accuracy. However, when the gain is high, the danger of instability due to feedback through the formation arises. Several manners of solving this instability problem are available, including breaking the AC feedback path, as for example, by converting the AC signal to a DC signal which is proportional to the AC signal, and controlling the gain of an amplifier with the DC signal, which amplifier resupplies an AC signal. However, in a system of this type, the phase shift between the input and output of the feedback circuit can become substantial. This presents problems of trouble-shooting the circuit due to the fact that high amplitude phase shifted signals are present in the circuit.

Another problem that may occur in systems where the AC feedback loop is broken, is that the zero reference level of a DC voltage controlled amplifier can vary with temperature, which temperature range in the borehole may be extreme. Additionally, if there is a large phase shifted signal on the input to the feedback amplifier, the accuracy of the phase-sensitive detector for converting the AC signal to a DC signal may be affected.

These aforementioned problems can be solved by utilizing linear amplifiers in the feedback circuits. However, by utilizing linear amplifiers in the feedback circuits, the problem of instability when the gain becomes substantial, presents itself again, which has the effect of limiting the gain that can be utilized in the feedback circuits. But, when the gain in a feedback circuit is reduced, the overall accuracy of the system is reduced.

Another problem that may arise in a focused electrode system is that the conductivity of the earth formations on either side of the survey electrode may be substantially different, as for example, at a boundary between different beds of earth strata. In this case, it would be desirable to have a focusing means that would differentiate between the two sides of the electrode system. One manner of accomplishing this is to provide two separate focusing amplifiers, one for each side of the electrode system. However, by so doing, any drifts in the amplifier characteristics might not be symmetrical as to both sides of the electrode system and may cause errors.

It is an object of the invention therefore to provide new and improved borehole investigating apparatus of the focused type for investigating subsurface earth formations traversed by a borehole.

In accordance with one feature of the invention, apparatus for investigating earth formations comprises an electrode system adapted for movement through the borehole and including a survey electrode, at least one focusing electrode and at least one pair of voltage monitoring electrodes located therebetween. The apparatus further comprises means for supplying an alternating current signal and means responsive to the difference between the potential of the supplied signal from the current supplying means and the potential at a point in the vicinity of said at least one pair of monitor electrodes for supplying sufficient current to at least a first one of the electrodes for maintaining the potential in the vicinity of said at least one pair of monitor electrodes substantially the same as the potential of the supplied signal. The apparatus also includes means responsive to the difference in potential between said at least one pair of monitor electrodes for supplying current between at least a second one of the electrodes and a point having a potential approximating the potential on said at least a second one of the electrodes and means responsive to the current supplied to at least one of the electrodes for providing an indication of the conductivity of the surrounding earth formations.

In accordance with another feature of the invention, apparatus for investigating earth formations comprises an electrode system adapted for movement through the borehole and including a survey electrode, at least one focusing electrode, and at least one pair of voltage monitoring electrodes located therebetween. The apparatus further comprises means for supplying an alternating current signal and means for sensing the difference in potential between the potential corresponding to a point intermediate of at least one of the pair of monitor electrodes and the potential of the alternating current signal. The apparatus further comprises linear amplifier means responsive to the sensed potential difference for supplying current to at least a first one of the electrodes and means responsive to the difference in potential between said at least one pair of monitor electrodes for supplying current to at least a second one of the electrodes. Additionally, the apparatus includes means responsive to the current supplied to at least one of the electrodes for providing an indication of the conductivity of the surrounding earth formations.

In accordance with still another feature of the invention, apparatus for investigating earth formations comprises an electrode system adapted for movement through the borehole and including a survey electrode and a focusing electrode on each side of the survey electrode. The apparatus further comprises means for supplying an alternating current signal to the survey electrode and common focusing means, including amplifier means, responsive to the potential at one or more points between the survey electrode and at least one focusing electrode for supplying focusing current to both focusing electrodes, the potential on each focusing electrode due to the common focusing means being substantially the same. The apparatus also comprises differential focusing means, including amplifier means, responsive to the difference in potential between a point intermediate of one focusing electrode and the survey electrode and a point intermediate of the other focusing electrode and the survey electrode for altering the potential on each focusing electrode a sufficient amount so as to maintain the two intermediate points at substantially the same potential and means coupled to the survey electrode for providing an indication of an electrical parameter of the surrounding earth formations.

For a better understanding of the present invention, together with other and further objects thereof, reference is had to the following description taken in connection with the accompanying drawings, the scope of the invention being pointed out in the appended claims.

Referring to the drawings:

The figure illustrates a focused electrode tool in the borehole along with a schematic representation of the electrical circuitry utilized in connection with the present invention.

Referring to the single figure of the drawings, there is shown a representative embodiment of apparatus constructed in accordance with the present invention for investigating subsurface earth formations 10 traversed by a borehole 11. Boreholes 11 is filled with a conductive drilling fluid or drilling mud 12. The borehole investigating apparatus includes an elongated cylindrical support member or housing member 13 to which are secured the electrodes for use with the present invention. Secured to the upper end of the support member 13 is an elongated cylindrical fluid-tight housing 14. Housing 14 contains various electrical circuits used in the operation of the electrodes mounted on support member 13. The downhole apparatus, including support member 13 and fluid-tight housing 14, is suspended from the surface of the earth by means of an armored multiconductor cable 15, the lower hundred feet or so of which is covered with an electrical insulation material 16. At the surface of the earth, the cable 15 is reeled in and out of the borehole by a drum and winch mechanism (not shown).

The electrode system includes a centrally located survey electrode $A_0$ attached to and supported by the support means 13, an upper focusing electrode $A_1$ situated above survey electrode $A_0$ and a lower focusing electrode $A_2$ situated below survey electrode $A_0$ on support means 13. An upper pair of monitor electrodes $M_1$ and $M_1'$ are located on support means 13 between survey electrode $A_0$ and upper focussing electrode $A_1$. Likewise, a lower pair of monitor electrodes $M_2$ and $M_2'$ are situated on support means 13 between survey electrode $A_0$ and lower focusing electrode $A_2$. Located at a fixed distance above upper focusing electrode $A_1$ is a focusing current return electrode $B_1$. Located above the fluid-tight housing 14 on the insulated portion 16 of armored multiconductor cable 15 is a survey current return electrode $B_0$. Located at some given distance above survey current return electrode $B_0$ on the insulation portion 16 of cable 15 is a potential reference electrode N.

The positions of the various electrodes shown in the drawing can vary somewhat depending on the borehole conditions encountered and the type of measurements to be made. Typically, the distance between survey electrode $A_0$ and focusing current return electrode $B_1$ may be in the neighborhood of 6 or 7 times the distance between survey electrode $A_0$ and focusing electrode $A_1$. Normally, potential reference electrode N is a relatively great distance removed from either of the return electrodes $B_0$ or $B_1$, although if conditions permit, potential reference electrode N can be relatively close to the current return electrodes $B_0$ and $B_1$. Survey current return electrode $B_0$ is normally relatively close to the focusing current return electrode $B_1$, say, for example, no more than a couple of feet or so. However, if desired, $B_0$ could be placed at a relatively great distance from $B_1$.

Now concerning the electrical circuitry which is connected to the electrodes, this electrical circuitry is shown within dotted line box 14 which corresponds to the fluid-tight housing 14. Of course, the downhole electrical circuitry could be contained in portions of the support means 13, if desired. The power for the downhole circuitry is supplied by conductors through armored multiconductor cable 15 (not shown).

The output of a current supply 17 is supplied to the primary winding 18 of a transformer 19, the primary winding 20 of a transformer 21, and to a phase-sensitive detector 22 as the phase-reference signal therefor. The secondary winding of transformer 19 is connected between potential reference electrode N and one side of the primary winding 23 of a transformer 24. The other side of the primary winding 23 is connected to the center tap of the primary winding 25 of a transformer 26. The secondary winding of transformer 24 is connected to the input of a linear amplifier 27, designated common $A_1$ and $A_2$ amplifier. The output of common $A_1$ and $A_2$ amplifier 27 is supplied to the primary winding of a transformer 28. The secondary winding 29 of transformer 28 is connected between focusing current return electrode $B_1$ and the center tap on the secondary winding 30 of a transformer 31.

The secondary winding of transformer 21 is connected between potential reference electrode N and one input of a linear amplifier 32, designated $A_0$ reference amplifier. The input and output ground return leads of $A_0$ reference amplifier 32 are connected to survey current return electrode $B_0$. The other output lead of $A_0$ reference amplifier 32 is connected through a low resistance measure resistor 33 and a capacitor 34 in series to one side of the secondary winding of a transformer 36. The other side of the secondary winding 35 is connected to survey electrode $A_0$.

The lower monitor electrodes $M_2$ and $M_2'$ are connected across the primary winding 37 of a transformer 38. The secondary winding of transformer 38 is connected to one input of an adding or mixer circuit 39. The upper monitor pair $M_1$ and $M_1'$ are connected across the primary winding 40 of a transformer 41. The secondary winding of transformer 41 is connected to another input of adding circuit 39. Adding circuit 39 combines the two applied input signals, while isolating the input circuits from one another, and supples a signal to the input of a linear amplifier 42, designated $A_0$ amplifier, which input signal is the sum of the two signals applied to adding circuit 39. The output of $A_0$ amplifier 42 is connected across the primary winding of transformer 36.

The center tap of the primary winding 37 of transformer 38 is connected through a capacitor 43 to one side of the primary winding 25 of transformer 26. The center tap of the primary winding 40 of transformer 41 is connected through a capacitor 44 to the other side of the primary winding 25 of transformer 26. The secondary winding of transformer 26 is connected to the input of a linear amplifier 45, designated differential $A_1$ and $A_2$ amplifier. The output of amplifier 45 is connected to the primary winding of the transformer 31. One end of the secondary winding 30 of transformer 31 is connected to upper focusing electrode $A_1$ and the other end of secondary winding 30 is connected to the lower focusing electrode $A_2$.

The primary winding 46 of a transformer 47 is connected across the measure resistor 33. The secondary winding of transformer 47 is connected to the input of a measure amplifier 48, the output of which is connected to the input of phase-sensitive detector 22. The output of phase-sensitive detector 22 is connected to a conductor pair 49 which is connected to a recorder 50 at the surface of the earth via armored multiconductor cable 15.

The spontaneous potential measurement, derived from survey electrode $A_0$, is supplied via conductor 51, which is connected to the junction point between the secondary winding 35 of transformer 36 and capacitor 34, to a choke 52 in series and then via armored multiconductor cable 15 to recorder 50 by a conductor 53.

Now concerning the operation of the present invention, a constant potential signal is induced in the secondary winding of transformer 19 from current supply 17. Since one side of the secondary winding of transformer 19 is connected to potential reference electrode N, a signal having a constant potential with respect to potential reference electrode N is supplied to one side of primary winding 23. The signal on the other side of primary winding 23 has a potential which is equal to the average value of the potentials existing midway between the upper monitor pair $M_1$ and $M_1'$ and the potential midway between the lower monitor pair $M_2$ and $M_2'$. This is due to the fact that the potentials at the center taps of primary winding 37 of transformer 38 and primary winding 40 of transformer 41 represent the average potential existing between lower monitor pair $M_2$ and $M_2'$ and upper monitor pair $M_1$ and $M_1'$ respectively. The difference in potential between this average potential derived from the center tap of primary winding 25 and the reference potential $E_{ref}$ from current supply 17 is amplified by common $A_1$ and $A_2$ amplifier 27 and supplied between upper and lower focusing electrodes $A_1$ and $A_2$ via the center tap of secondary winding 30 of transformer 31 and focusing current return electrode $B_1$. Common $A_1$ and $A_2$ amplifier 27 will continue to supply sufficient current between the focusing electrodes $A_1$ and $A_2$ and return electrode $B_1$ such as to maintain the input voltage to common $A_1$ and $A_2$ amplifier as low as possible. Thus, it can be seen that through this feedback action, sufficient current is supplied to the $A_1$ and $A_2$ electrodes so that the average value of the potential existing at points midway of monitor pair electrodes $M_1$ and $M_1'$ and $M_2$ and $M_2'$ is maintained substantially equal to the reference voltage $E_{ref}$.

The feedback circuit comprising monitor pair electrodes $M_1$ and $M_1'$ and $M_2$ and $M_2'$, transformers 38 and 41, adding circuit 39, $A_0$ amplifier 42, and transformer 36 to survey electrode $A_0$ and survey current return electrode $B_0$, act to maintain the difference in potential between upper monitor pair electrodes $M_1$ and $M_1'$ and the potential difference between lower monitor pair electrodes $M_2$ and $M_2'$ substantially zero. The potential difference between lower monitor pair electrodes $M_2$ and $M_2'$ is supplied to adding circuit 39 through transformer 38 and the potential difference between upper monitor pair electrodes $M_1$ and $M_1'$ is supplied to adding circuit 39 through transformer 41. Adding circuit 39 supplies a signal to $A_0$ amplifier 42 proportional to the average value of these two applied potential differences. $A_0$ amplifier 42 then supplies sufficient current between survey electrode $A_0$ and survey current return electrode $B_0$ to reduce this average potential difference substantially to zero.

To reduce the gain requirements of $A_0$ amplifier 42, the return path for the survey current which is supplied to survey electrode $A_0$ is connected to $A_0$ reference amplifier 32, which supplies an output potential approximately equal to the reference potential $E_{ref}$, between survey current return electrode $B_0$ and the secondary winding 35 of transformer 36. By this means, the gain requirements of $A_0$ amplifier 42 are relatively light since both sides of secondary winding 35 are at nearly the same potential. The output impedance from $A_0$ reference amplifier 32 is very low to keep the voltage drop due to the survey current at a minimum.

The reference potential $E_{ref}$ is supplied to the $A_0$ reference amplifier 32 by transformer 21. The potential across the secondary winding of transformer 21 is equal to $E_{ref}$. The $A_0$ reference amplifier 32 has a very high input impedance to eliminate feedback between potential reference electrode N and the survey current return electrode $B_0$. The gain of $A_0$ reference amplifier 32 is approximately 1, and thus the potential developed across the output terminals of $A_0$ reference amplifier 32 is approximately equal to $E_{ref}$. Thus, it can be seen that the gain required of $A_0$ amplifier 42 is substantially reduced because of $A_0$ reference amplifier 32. Additionally, since $A_0$ reference amplifier 32 introduces a negligible impedance into the survey current path, a substantially high survey current can be used without any adverse effect on the system accuracy due to unwanted voltage drops.

Since the borehole conditions on one side of survey electrode $A_0$ may be different from the borehole conditions on the other side of survey electrode $A_0$, the potential on one of the focusing electrodes $A_1$ or $A_2$ may have to be different from the potential on the other focusing electrode to maintain the point intermediate of upper monitor electrodes $M_1$ and $M_1'$ equal to the potential intermediate of lower monitor electrodes $M_2$ and $M_2'$. The differential $A_1$ and $A_2$ amplifier 45 performs this function by monitoring the potential at the center tap of secondary winding 37 of transformer 38 and the potential at the center tap of the primary winding 40 of transformer 41 and varying the potential on either upper or lower focusing electrodes $A_1$ and $A_2$ such as to maintain the input voltage to differential $A_1$ and $A_2$ amplifier 45 as low as possible. By this feedback means, differential $A_1$ and $A_2$ amplifier 45, through transformer 31, maintains the potentials at the intermediate points between the monitor pairs substantially equal to one another. It can be seen that by utilizing common amplifiers for both of the focusing electrodes $A_1$ and $A_2$ (both amplifiers 27 and 45 are common to $A_1$ and $A_2$), any variations in the characteristics of either amplifier will be symmetrical with respect to both sides of the survey electrode $A_0$, thus minimizing errors due to drift, etc.

Since the potential intermediate of upper and lower monitor pairs $M_1-M_1'$ and $M_2-M_2'$ are held at a constant value and the difference in potential between upper monitor electrodes $M_1$ and $M_1'$ and the difference in potential between lower monitor pair $M_2$ and $M_2'$ are held at substantially zero potential difference, thus signifying zero current flow on both sides of survey electrode $A_0$, it can be assumed that survey electrode $A_0$ is held at the constant reference potential $E_{ref}$. Thus, only the current emitted from survey electrode $A_0$ need be known to determine the conductivity of the surrounding earth formations. The current being emitted from survey electrode $A_0$ must travel through measure resistor 33. Thus, the potential developed across measure resistor 33 is proportional to the survey current. This voltage is amplified by measure amplifier 48 and that portion of the output voltage from measure amplifier 48 which is in-phase with the voltage from current supply 17 is detected by phase-sensitive detector 22. Thus, a DC signal proportional to the survey current is transmitted to the surface of the earth via conductor 49. The spontaneous potential measurement is derived from survey electrode $A_0$ and transmitted to recorder 50 at the surface of the earth via conductor 53. Choke 52 blocks the frequency of current supply 17, and capacitors 34, 43 and 44 block the spontaneous potential (which is a DC-type signal). The system of the present invention can be used simultaneously with an induction logging system, by inserting frequency traps at points 54, 55 and 56, which block the frequency of the induction logging system.

The accuracy of the conductivity measurements of a focused type electrode system depends to a large extent on maintaining the potential at points on either side of the survey electrode substantially equal to the potential of the survey electrode. In this case, the "points" are intermediate of each monitor pair. Additionally, for a constant voltage electrode system, this potential must be held at a constant value for good accuracy. Likewise, for a constant current system, the current must be maintained at a constant value. However, it is not always easy to maintain these conditions. For example, even under good borehole conditions, the potentials will not all be exactly equal, as desired, due to the fact that the closed loop feedback gain can not be infinite. To obtain a given accuracy under all borehole conditions, a specified closed loop feedback gain is required for each of the feedback circuits. If the gain of one feedback circuit can be increased, then the gain of another feedback circuit can be decreased, and still obtain the same accuracy. Of course, as stated earlier, there is an upper limit on the gain which may be utilized due to stability problems of the feedback circuits. This stability problem can be solved by breaking the AC loop with a DC control circuit, but as stated earlier, this presents problems of maintaining accuracy with increases in temperature, and the problem of maintaining accuracy in the phase-sensitive detectors due to the large quadrature phase voltage component present.

However, by returning the $A_0$ amplifier 42 to a potential approximating the potential present on the $A_0$ electrode, the gain of the $A_0$ amplifier 42 does not have to be nearly as large, for the same accuracy requirements, as when it is returned directly to the survey current return electrode $B_0$. Thus, if the gain of the $A_0$ amplifier 42, as a linear amplifier, is as high as possible short of instability, the overall gain of the $A_0$ current supply system, which now comprises both the $A_0$ amplifier 42 and $A_0$ reference amplifier 32, is very high. Thus, to maintain the same accuracy, the focusing amplifiers 27 and 45 can get by with less gain than was heretofore required. In fact, it has been found that the gain required of the focusing amplifiers 27 and 45, when used with the $A_0$ current supply system, is such as to allow the focusing amplifiers 27 and 45 to be linear amplifiers, without sacrificing the accuracy obtained in earlier systems. Of course, without the accuracy requirements, the focusing amplifiers 27 and 45 could be linear amplifiers without regard to the survey current supply system.

The utilization of the $A_0$ reference amplifier 32 presents an opportunity to gain further accuracy in the system. As stated earlier, the potential on the $A_0$ electrode is not identically the same as the potential at the points on either side of the A electrode. The $A_0$ reference amplifier 32 or transformer 21 can be adjusted prior to a logging run in the borehole so that the potential at point 54 in the survey current circuit is equal to the potential at the center tap of the primary winding 25 of transformer 26 (shown in the drawing as a variable control 57 on the secondary winding of transformer 21, for example). This, then, insures that the potential on the $A_0$ electrode is maintained even closer to the average of the potential intermediate of upper monitor electrodes $M_1$ and $M_1'$ and lower monitor pair $M_2$ and $M_2'$, than has heretofore been possible.

Additionally, the features of the present invention could be utilized in other systems. For example, the common and differential focusing feature of this invention comprising common and differential $A_1$ and $A_2$ amplifiers 27 and 45 and the associated circuitry, could be utilized with a constant current system, that is, a system where the survey current is held constant and the voltage variations measured.

While there has been described what is at present considered to be a preferred embodiment of this invention, it will be obvious to those skilled in the art that various changes and modifications may be made therein without departing from the invention, and it is, therefore, intended to cover all such changes and modifications as fall within the true spirit and scope of the invention.

What is claimed is:
1. In apparatus for investigating earth formations traversed by a borehole, the combination comprising:
   (a) an electrode system adapted for movement through the borehole and including a survey electrode, at least one focusing electrode and at least one pair of voltage monitoring electrodes located therebetween;
   (b) first means for supplying an alternating current signal;
   (c) second means responsive to the difference between the potential of the supplied signal from the current supplying means and the potential at a point in the vicinity of said at least one pair of monitor electrodes for supplying sufficient current to at least a first one of the electrodes for maintaining the potential in the vicinity of said at least one pair of monitor electrodes substantially the same as the potential of the supplied signal;
   (d) third means responsive to the difference in potential between said at least one pair of monitor electrodes for supplying current between at least a second one of the electrodes and a point having a potential approximating the potential on said at least a second one of the electrodes; and
   (e) means responsive to the current supplied to at least one of the electrodes for providing an indication of the conductivity of the surrounding earth formations.

2. The apparatus of claim 1 wherein said at least a first one of the electrodes comprises said at least one focusing electrode and said at least a second one of the electrodes comprises the survey electrode.

3. The apparatus of claim 1 wherein the electrode system further includes a remotely located potential reference electrode and the third means comprises:
   (a) means coupled to the potential reference electrode for supplying a first potential reference signal having a substantially constant peak amplitude with respect to the potential reference electrode; and
   (b) means, including amplifier means, responsive to the difference in potential between said at least one pair of monitor electrodes for supplying current between said at least a second one of the electrodes and the means for supplying the first potential reference signal, so that the gain requirements of the amplifier means are relatively small.

4. The apparatus of claim 3 wherein the amplifier means is linear.

5. The apparatus of claim 4 wherein the second means includes amplifier means, which amplifier means is linear.

6. The apparatus of claim 3 wherein the means for supplying a first potential reference signal includes a reference amplifier means having a low output impedance and a high input impedance.

7. The apparatus of claim 6 wherein:
   (1) the electrode system comprises a focusing electrode located on either side of the survey electrode, and two pairs of monitor electrodes, each pair located intermediate of the survey electrode and a focusing electrode, and
   (2) the third means includes:
      (a) means responsive to the potential difference between each pair of monitor electrodes for providing a signal representative of the average value of the monitor pair potential differences; and
      (b) linear amplifier means responsive to the average value of the monitor pair potential differences for supplying survey current to the survey electrode, the survey current return path being coupled through the output terminals of the reference amplifier means to a survey current return electrode located at a distance from the survey electrode, so that the gain requirements of the linear amplifier means are relatively small.

8. The apparatus of claim 3 and further including means adapted for altering the potential of the first potential reference signal so as to be substantially equal to said potential at a point in the vicinity of said at least one pair of monitor electrodes.

9. In apparatus for investigating earth formations traversed by a borehole, the combination comprising:
(a) an electrode system adapted for movement through the borehole and including a survey electrode, at least one focusing electrode, and at least one pair of voltage monitoring electrodes located therebetween;
(b) means for supplying an alternating current signal;
(c) means for sensing the difference in potential between the potential corresponding to a point intermediate of at least one of the pair of monitor electrodes and the potential of the alternating current signal;
(d) linear amplifier means responsive to the sensed potential difference for supplying current to at least a first one of the electrodes;
(e) means responsive to the difference in potential between said at least one pair of monitor electrodes for supplying current to at least a second one of the electrodes; and
(f) means responsive to the current supplied to at least one of the electrodes for providing an indication of the conductivity of the surrounding earth formations.

10. The apparatus of claim 9 wherein the means for supplying current to at least a second one of the electrodes includes:
(a) means responsive to the potential difference between said at least one pair of monitor electrodes for providing an output signal representative of said potential difference; and
(b) linear amplifier means responsive to the output signal for supplying the current to said at least a second one of the electrodes.

11. In apparatus for investigating earth formations traversed by a borehole, the combination comprising:
(a) an electrode system adapted for movement through the borehole and including a survey electrode and a focusing electrode on each side of the survey electrode;
(b) means for supplying an alternating current signal to the survey electrode;
(c) common focusing means, including amplifier means, responsive to the potential at one or more points between the survey electrode and at least one focusing electrode for supplying focusing current to both focusing electrodes, the potential on each focusing electrode due to the common focusing means being substantially the same;
(d) differential focusing means, including amplifier means, responsive to the difference in potential between a point intermediate of one focusing electrode and the survey electrode and a point intermediate of the other focusing electrode and the survey electrode for altering the potential on each focusing electrode a sufficient amount so as to maintain the two intermediate points at substantially the same potential; and
(e) means coupled to the survey electrode for providing an indication of an electrical parameter of the surrounding earth formations.

12. The apparatus of claim 11 wherein:
(1) the means for supplying an alternating current signal to the survey electrode comprises:
(a) means for generating an alternating current signal;
(b) means, including amplifier means, responsive to the potential gradient at points between the survey electrode and at least one focusing electrode for supplying sufficient current to the survey electrode to maintain the potential gradient at a minimum;
(2) the common focusing means is responsive to the potential difference between the potential of the alternating current signal and the potential at a point between the survey electrode and at least one focusing electrode for supplying sufficient current to both focusing electrodes as to maintain said potential difference substantially zero; and
(3) the means for providing an indication of an electrical parameter comprises means responsive to the magnitude of the current supplied to the survey electrode for providing an indication of the conductivity of the surrounding earth formations.

13. The apparatus of claim 12 fherein said amplifier means are linear amplifier means and the means for supplying current to the survey electrode is returned to a point having a potential approximating the potential of the survey electrode.

References Cited
UNITED STATES PATENTS

| | | | |
|---|---|---|---|
| 2,925,551 | 2/1960 | Segesman | 324—1 |
| 3,056,917 | 10/1962 | Tanguy | 324—1 |
| 3,068,401 | 12/1962 | Janssen | 324—10 XR |
| 3,096,477 | 7/1963 | Smith et al. | 324—1 |
| 3,103,626 | 9/1963 | Burton et al. | 324—10 XR |
| 3,262,050 | 7/1966 | Threadgold et al. | 324—10 |

RUDOLPH V. ROLINEC, *Primary Examiner.*

G. R. STRECKER, *Assistant Examiner.*